(12) United States Patent
Matsumoto

(10) Patent No.: US 7,543,487 B2
(45) Date of Patent: Jun. 9, 2009

(54) TRAVELING TEST APPARATUS PROVIDED WITH FLAT-BELT MECHANISM FOR VEHICLE

(75) Inventor: Sigeru Matsumoto, Tokyo (JP)

(73) Assignee: Kokusai Keisokuki Kabushiki Kaisha, Tama_Shi (JP)

( * ) Notice: Subject to any disclaimer, the term of this patent is extended or adjusted under 35 U.S.C. 154(b) by 0 days.

(21) Appl. No.: 11/978,082

(22) Filed: Oct. 26, 2007

(65) Prior Publication Data

US 2008/0087104 A1      Apr. 17, 2008

Related U.S. Application Data

(63) Continuation of application No. PCT/JP2006/308908, filed on Apr. 27, 2006.

(30) Foreign Application Priority Data

Apr. 28, 2005    (JP)    ............................. 2005-133258

(51) Int. Cl.
    *G01M 17/00*    (2006.01)
(52) U.S. Cl. ..................................... 73/116.07; 73/670
(58) Field of Classification Search ................ 73/670, 73/116.01, 116.05, 116.06, 116.07, 116.08, 73/116.09, 116.11, 669

See application file for complete search history.

(56) References Cited

U.S. PATENT DOCUMENTS

| | | | | |
|---|---|---|---|---|
| 3,712,128 A | * | 1/1973 | Beissbarth | ................... 73/126 |
| 3,886,788 A | * | 6/1975 | Jeter, Jr. | ................... 73/116.11 |
| 4,862,737 A | * | 9/1989 | Langer | ................... 73/116.07 |
| 4,942,762 A | * | 7/1990 | Schober et al. | .......... 73/116.07 |
| 4,953,391 A | * | 9/1990 | Schober et al. | .......... 73/116.07 |
| 5,148,703 A | * | 9/1992 | Vaughan et al. | ............... 73/123 |
| 6,427,528 B1 | | 8/2002 | Yamakado et al. | |
| 7,255,016 B2 | * | 8/2007 | Burton | ..................... 73/864.45 |

FOREIGN PATENT DOCUMENTS

| | | |
|---|---|---|
| JP | SHO 50-11276 | 2/1975 |
| JP | HEI 6-18369 | 1/1994 |
| JP | HEI 10-221215 | 8/1998 |
| JP | 2000-19072 | 1/2000 |
| JP | 2004-191108 | 7/2004 |
| JP | 2005-17269 | 1/2005 |

* cited by examiner

*Primary Examiner*—Eric S McCall
(74) *Attorney, Agent, or Firm*—Day Pitney LLP

(57) ABSTRACT

A traveling test apparatus for a vehicle includes a flat-belt mechanism that includes a first pair of rollers, and a first endless belt wound around the first pair of rollers, the flat-belt mechanism being configured such that at least one tire of the vehicle contacts the first endless belt, and that the first endless belt is revolved around the first pair of rollers by rotation of the at-least-one tire, and a supporting belt mechanism that includes a second pair of rollers, and a second endless belt wound around the second pair of rollers, the supporting belt mechanism being configured such that an upper outer circumferential surface of the second endless belt contacts an upper inner circumferential surface of the first endless belt, and that the second endless belt is revolved around the second pair of rollers by the rotation of the at least one tire.

20 Claims, 6 Drawing Sheets

TRAVELING TEST APPARATUS PROVIDED WITH FLAT-BELT MECHANISM FOR VEHICLE

CROSS-REFERENCE TO RELATED APPLICATION

This is a Continuation Application based on International Application No. PCT/JP2006/308908 filed on Apr. 27, 2006, which claims priority from Japanese Patent Application No. 2005-133258 filed on Apr. 28, 2005. The entire disclosures of the prior applications are incorporated herein by reference.

BACKGROUND

1. Field of the Invention

The present invention relates to a traveling test apparatus for a vehicle that establishes contact with a tread surface of a tire provided to a vehicle such as a car and measures a force received from the rotating tire and/or a circumferential velocity of the rotating tire.

2. Related Art

Conventionally, a traveling test apparatus for a vehicle, as described in Japanese Patent Provisional Publication No. HEI 6-18369, has been used in order to examine whether each of various traveling performances of a car satisfies a predetermined standard in a final inspection of a car manufacturing line or a car inspection. The traveling test apparatus includes a roller contacting with a tire provided to the car, a driving motor rotating the roller, and various sensors. The tire is driven by rotating the roller after setting the car such that the tire is placed on the roller. Various measurement values at the time when the tire is driven (e.g., a variation of a load and a circumferential velocity of the tire) are measured by the sensors. By carrying out tests using the above mechanism, test results which are substantially the same as those obtained through traveling on an actual road can be acquired even in a limited test space.

With such a test apparatus, a braking force measurement, force variation measurement, and speedometer test can be performed. Here, the braking force measurement is a test for checking whether a braking force of a foot brake or side brake of the car satisfies a predetermined standard. The force variation measurement is a test for measuring each force component generated while driving the car (6 component forces including component forces parallel to respective axes along a back-and-forth direction, right-and-left direction, and up-and-down direction, and moments of forces with respect to the respective axes). Further, the speedometer test is a test for verifying whether indication of a speedometer of the car shows an appropriate speed.

However, in such a conventional traveling test apparatus, what establishes contact with the tread surface of the tire is not a plane equivalent to a road surface but a circumferential surface of the roller. Accordingly, the tests using the conventional traveling test apparatus are not strictly equal to the traveling tests performed on the road.

Additionally, in the braking force measurement, it is required to rotate the tire with a low speed (approximately a circumferential velocity of 0.1 to 0.25 [km/h]) and relatively high torque. Meanwhile, in the speedometer test and force variation measurement, it is needed to rotate the tire with a high speed (approximately a circumferential velocity of 6 to 40 [km/h]). Therefore, in order to implement the speedometer test, force variation measurement, and braking force measurement with a single apparatus, it has been necessary to employ a motor that allows the tire to rotate with a high speed and high torque or a motor configured to be switchable between low-speed and high-torque driving and high-speed and low-torque driving. However, since such motors are expensive, a test apparatus for performing the braking force measurement and a test apparatus for performing the speedometer test and/or force variation measurement have separately been provided so far.

Further, conventionally, to measure the variation of the load transmitted from the tire to the roller, a load cell configured with a strain gauge being incorporated into an elastic body has been used. It is required for the braking force measurement, in which a high load has to be measured, to use a load cell with a measurement range of approximately 0 to 1000 [kgf]. Meanwhile, it is needed for the force variation measurement to measure a relatively small load of approximately 0 to 100 [kgf] more accurately. In general, an output of the load cell includes a measurement deviation of approximately 0.1 to 0.5 [%]. Thus, the measurement deviation of the load cell for the braking force measurement is approximately 1 to 5 [kgf], and it is impossible to accurately measure the force variation with the load cell for the above braking force measurement. For this reason, when the braking force measurement and force variation measurement are performed with the same apparatus, separate load cells have to be prepared for the braking force measurement and force variation measurement, respectively.

SUMMARY OF THE INVENTION

The present invention is advantageous in that there is provided an improved traveling test apparatus for a vehicle that makes it possible to perform a speedometer test, force variation measurement, and braking force measurement under conditions close to those on an actual road surface.

According to an aspect of the present invention, there is provided a traveling test apparatus for a vehicle, which includes a flat-belt mechanism that includes a first pair of rollers, and a first endless belt wound around the first pair of rollers, the flat-belt mechanism being configured such that at least one tire of the vehicle can contact with the first endless belt, and that the first endless belt is revolved around the first pair of rollers by rotation of the at least one tire, and a supporting belt mechanism, arranged within a space surrounded by the first pair of rollers and the first endless belt, which includes a second pair of rollers and a second endless belt wound around the second pair of rollers, the supporting belt mechanism being configured such that an upper outer circumferential surface of the second endless belt contacts with an upper inner circumferential surface of the first endless belt, and that the second endless belt is revolved around the second pair of rollers by the rotation of the at least one tire.

According to another aspect of the present invention, there is provided a traveling test apparatus for a vehicle, which includes a flat-belt mechanism that includes a first pair of rollers, a first endless belt wound around the first pair of rollers, and a motor, the flat-belt mechanism being configured such that at least one tire of the vehicle can contact with the first endless belt, and that the at least one tire is rotated by the first endless belt revolved around the first pair of rollers by rotation of the motor, and a supporting belt mechanism, arranged within a space surrounded by the first pair of rollers and the first endless belt, which includes a second pair of rollers, and a second endless belt wound around the second pair of rollers, the supporting belt mechanism being configured such that an upper outer circumferential surface of the second endless belt contacts with an upper inner circumferential surface of the first endless belt, and that the second endless belt is revolved around the second pair of rollers by the rotation of the motor.

According to the above configurations, unlike such a conventional configuration that a cylindrical surface of the roller contacts with the tire, the traveling test apparatus is configured such that the tire of the vehicle is placed on the upper outer circumferential surface of the endless belt extending substantially in a planar shape. Hence, the above configuration can actualize test environments closer to the actual road surface state than the conventional configuration.

Further, the tire of the car is supported by two endless belts each of which is hung around a different pair of rollers. Therefore, the above configurations make it possible to make a force applied to each of the endless belts smaller than a configuration with only one endless belt and to reduce the thickness of each of the endless belts. Thus, it is possible to bend each of the endless belts with a small curvature radius and to use rollers with small diameters. Consequently, a small-sized apparatus can be actualized.

BRIEF DESCRIPTION OF THE ACCOMPANYING DRAWINGS

DETAILED DESCRIPTION OF THE EMBODIMENT

Figure 1:
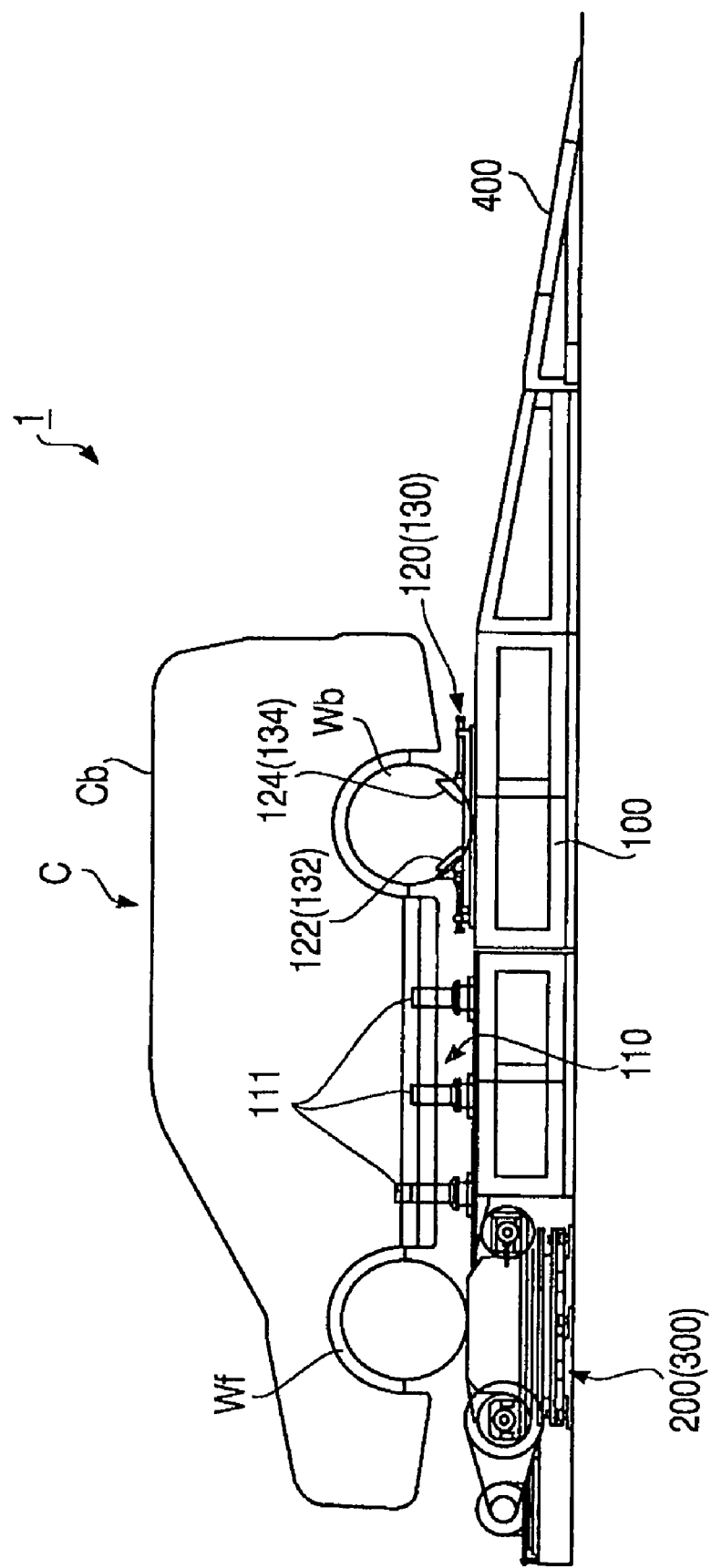
FIG. 1 is an elevational view of a traveling test apparatus for a vehicle in a first embodiment according to the present invention.
Figure 2:
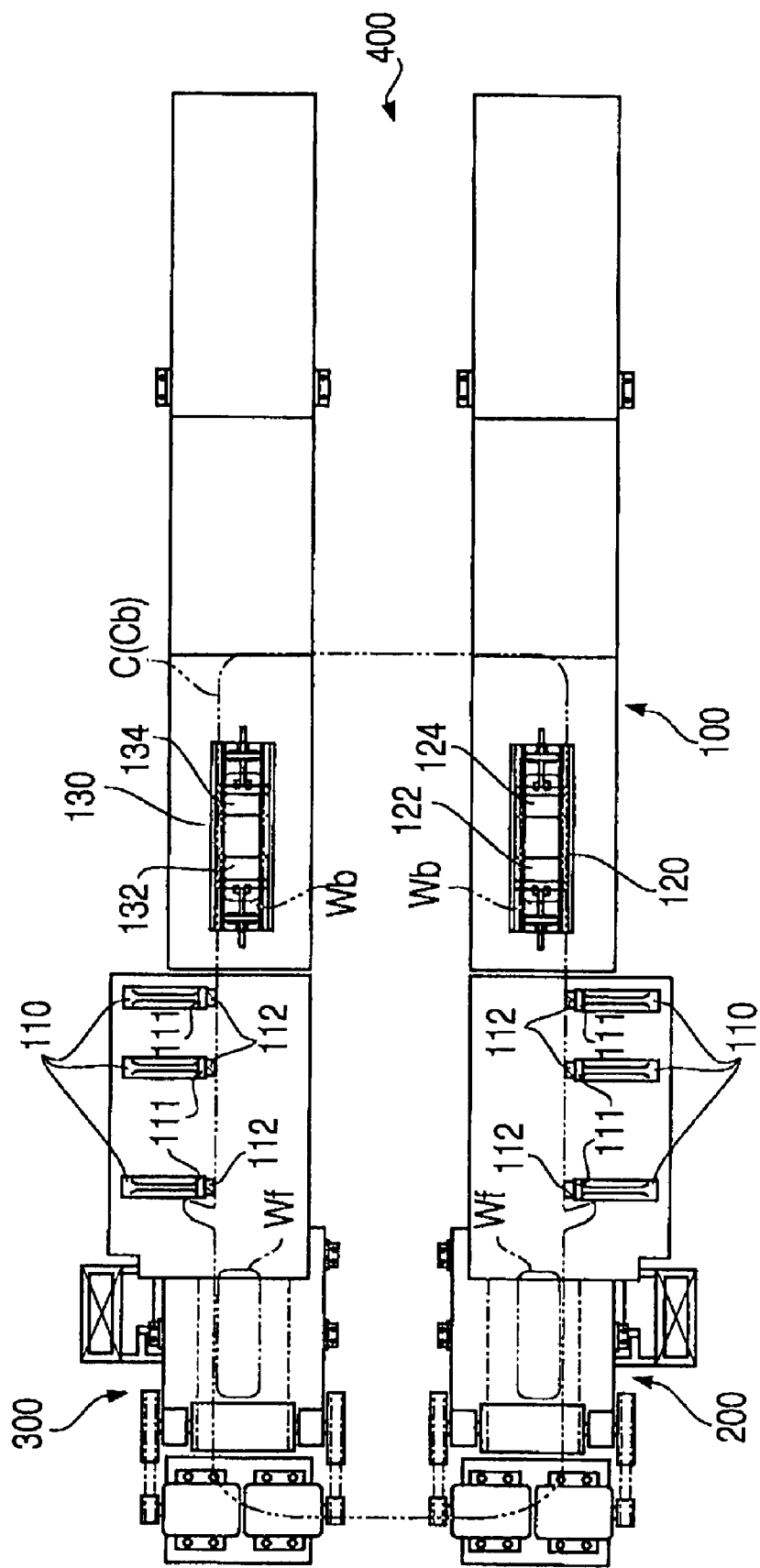
FIG. 2 is a top view of the traveling test apparatus for the vehicle in the first embodiment according to the present invention.

Hereinafter, embodiments according to the present invention will be described with reference to the accompanying drawings. FIG. 1 is an elevational view of a traveling test apparatus 1 for a vehicle in a first embodiment according to the present invention. In addition, FIG. 2 is a top view of the traveling test apparatus 1 for the vehicle. The traveling test apparatus 1 for the vehicle is an apparatus for providing road surface conditions in actual car driving to ones of front tires and rear tires of a car and measuring a force applied from each tire of the car to the traveling test apparatus and a circumferential velocity of the tire. The measurement results are sent to a control unit 800 (described later) of the traveling test apparatus 1, and it is judged by the control unit 800 whether braking characteristics of the car or accuracies of measuring instrument meters of the car are within their respective predetermined standards.

As shown in FIG. 1, the traveling test apparatus 1 is provided with a base stage 100 for fixing a body Cb of a car C to be tested thereto, a pair of flat belt mechanisms 200 and 300 (see FIG. 2) on which front tires Wf of the car C are placed, respectively, and a slope 400 for transferring the car C onto the base stage 100 and flat belt mechanisms 200 and 300.

As shown in FIG. 1, there are provided on the base stage 100 L-shaped guides 110 for fixing the body Cb of the car C and a pair of tire holding means 120 and 130 for fixing two rear tires Wb of the car C.

Three L-shaped guides are provided at each of both sides of the car C such that one end thereof establishes contact with a corresponding one of both side surfaces of the body Cb of the car C. A pad 112 (see FIG. 2) formed from rubber, urethane, or the like is attached to one end 111 of each of the L-shaped guides 110 that is to establish contact with the body Cb of the car C. Owing to a frictional force generated between the pads 112 and the body Cb, the car C is held so as not to be moved. Further, in order to meet cars of various widths and shapes, each of the L-shaped guides 110 is configured to adjust a position thereof in the right-and-left direction and height of the aforementioned one end 111 thereof. There can be utilized as a mechanism for implementing the adjustment various widely-known position adjustment mechanism such as a rack-and-pinion mechanism, feed screw mechanism, and hydraulic mechanism.

It is noted that, in the present embodiment, the L-shaped guides 110 sandwich the body Cb of the car C in the right-and-left direction to hold the car C, yet the present invention is not limited to the aforementioned configuration, and alternatively such a mechanism as to fix a jack-up point of the car C to the base stage 100 may be employed.

Each of the tire holding means 120 (130) is provided with clamps 122 (132) and 124 (134) to grip the tire in back-and-forth direction. Each of the clamps 122 (132) and 124 (134) are movable back and forth, and there can be utilized as a movement mechanism a various widely-known position adjustment mechanism such as a rack-and-pinion mechanism, feed screw mechanism, and hydraulic mechanism.

Figure 3:
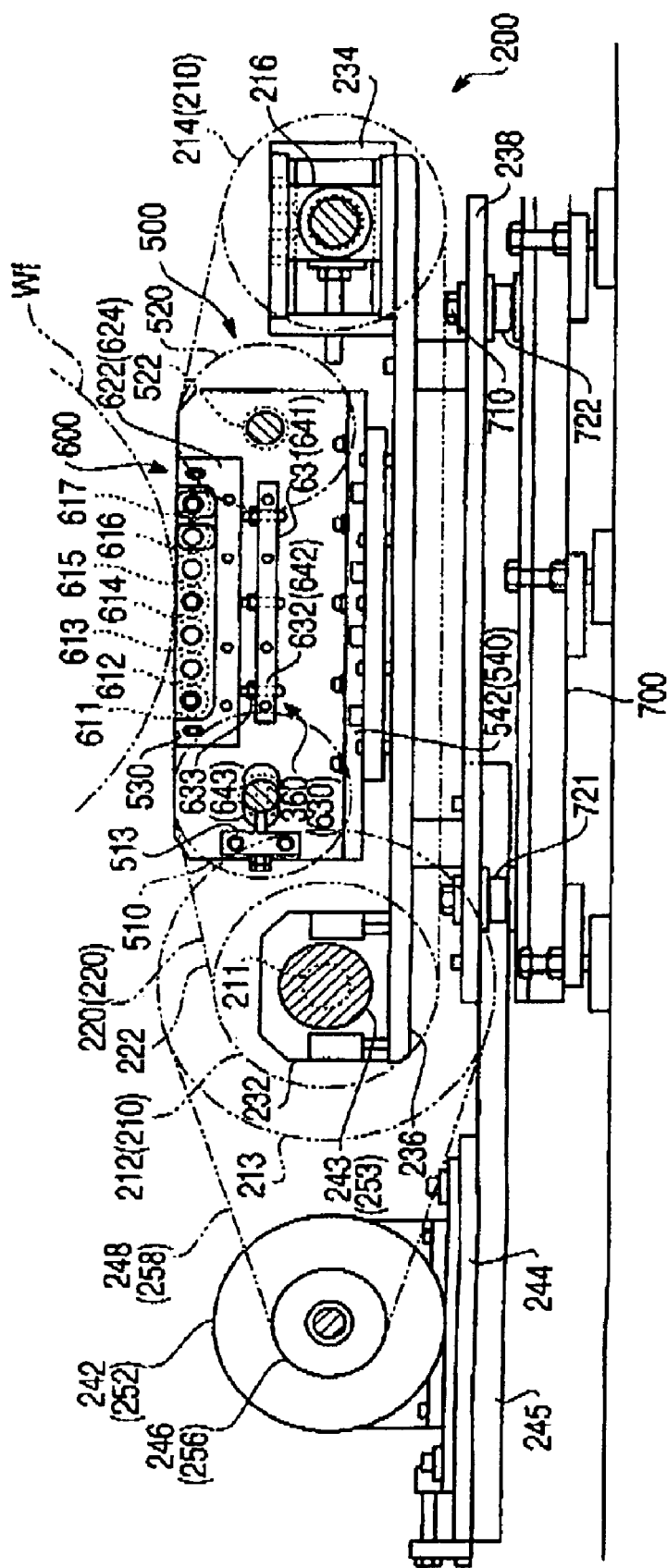
FIG. 3 is an elevational view of a steel belt mechanism of the traveling test apparatus for the vehicle in the first embodiment according to the present invention.
Figure 4:
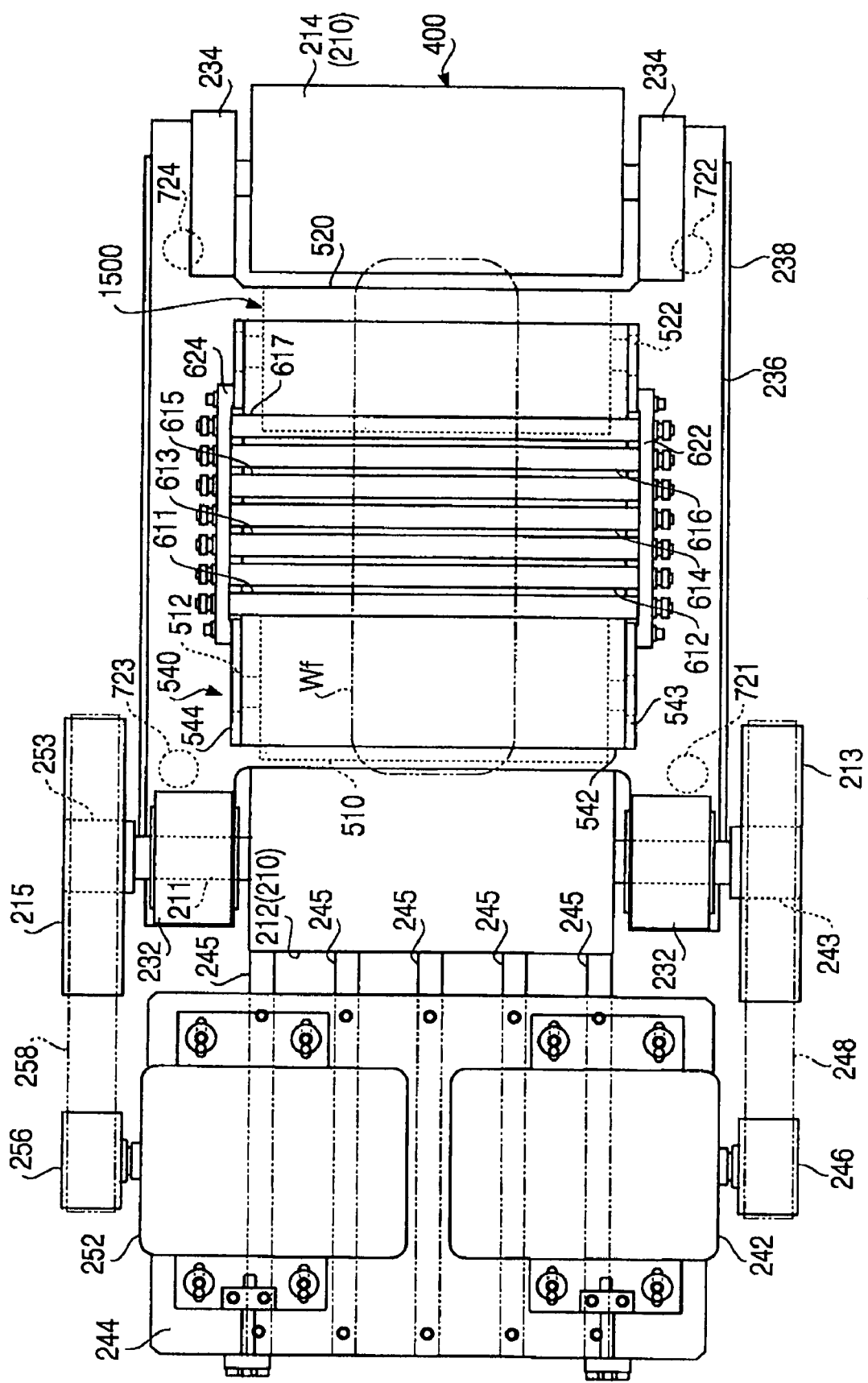
FIG. 4 is a top view of the steel belt mechanism of the traveling test apparatus for the vehicle in the first embodiment according to the present invention.

Hereinafter, explanation of the flat-belt mechanisms 200 and 300 will be given. FIG. 3 is an elevational view of the flat-belt mechanism 200 in the present invention. In addition, FIG. 4 is a top view of the flat-belt mechanism 200. It is noted that, as shown in FIG. 4, the flat-belt mechanism 300 is configured and arranged to establish bilaterally-symmetric relationship with the flat-belt mechanism 200 with the same structure as that of the flat-belt mechanism 200, and therefore explanation thereof will be omitted.

As shown in FIG. 3, the flat-belt mechanism 200 includes a roller pair 210 of a driving roller 212 and a driven roller that respectively extend in a width direction of the car C (vertical direction in FIG. 4) and an endless belt 220 mutually connecting the roller pair 210. The driving roller 212 and driven roller 214 are aligned in the back-and-forth direction, and the endless belt 220 revolves around the roller pair along with the rotation of the driving roller 212, while the driven roller 214 is rotated along with the movement of the endless belt 220. It is noted that diameters of the driving roller 212 and driven roller 214 are approximately 260 [mm].

The endless belt 220 is a steel plate with a thickness of approximately 0.3 [mm], and a slip-resistance rubber material such as Safetywalk (trademark registered) is attached onto an outer circumferential surface of the endless belt 220. A frictional coefficient of the slip-resistance material 222 is higher than that of the steel endless belt 220, and the attachment of the slip-resistance material 222 makes the frictional coefficient between the traveling test apparatus and the tire close to that on the actual road. Thereby, conditions close to those on the actual asphalt road are reproduced, and a test environment close to an actual traveling test can be attained.

The driven roller 214 includes a driven roller adjustment mechanism 216 for shifting the driven roller 214 in the back-and-forth direction. The driven roller adjustment mechanism 216 is configured to shift the driven roller 214 with a feed screw mechanism, and thereby a tension of the endless belt 220 is adjusted to be an appropriate value.

The driving roller 212 and driven roller 214 are rotatably supported by bearings 232 and 234, respectively. The bearings 232 and 234 are both fixed onto a roller supporting plate 236. Further, roller supporting plate 236 is fixed onto a main supporting plate 238.

In addition, there is fixed to the main supporting plate 238 via arms 245 a motor supporting plate 244 on which a first driving motor 242 for rotating the driving roller 212. As shown in FIG. 4, a first driven pulley 213 is provided around a rotation shaft 211 of the driving roller 212. A first driving pulley 246 provided around a rotation shaft of the driving motor 242 and the first driven pulley 213 are mutually linked with an endless belt 248 made of material such as cloth and resin. Hence, by rotating the first driving motor 242, the driving roller 212 can be rotated.

Additionally, a second driving motor 252 for rotating the driving roller 212 is placed and fixed on the motor supporting plate 244. As shown in FIG. 4, a second driven pulley 215 is provided around a rotation shaft 211 of the driving roller 212, and a second driving pulley 256 provided around the rotation shaft 211 of the second driving motor 252 and the second driven pulley 215 are linked via an endless belt 258 made of material such as cloth and resin. Accordingly, by rotating the second driving motor 252, the driving roller 212 can be rotated as well.

The first driving motor 242 is a motor that is rotatable with a lower speed and higher torque than those of the second driving motor 252. The first driving motor 242 is used for measuring the braking force applied to the tire, while the second driving motor 252 is used for measuring the accuracy of the speedometer of the car C.

A first one-way bearing 243 is provided between the first driven pulley 213 and the rotation shaft 211 of the driving roller 212. In addition, a second one-way bearing 253 is provided between the second driven pulley 215 and the rotation shaft 211 of the driving roller 212. Therefore, the rotation shaft 211 is driven in accordance with one rotated with a larger number of revolutions between the first and second driven pulleys 213 and 215. Thus, even though only one of the first and second driving motors 242 and 252 is driven, a motor being not driven does not provide any rotational resistance to the other motor being driven, and thereby the endless belt 220 can smoothly be rotated.

It is noted that, in the present embodiment, the first and second driven pulleys 213 and 215 and the first and second one-way bearings 243 and 253 are respectively provided at both ends of the rotation shaft 211, yet the present invention is not limited to the aforementioned configuration, and for example, the first and second driven pulleys 213 and 215 and the first and second one-way bearings 243 and 253 may be provided only to one end of the rotation shaft 211. Such a configuration makes it possible that the endless belt 220 and a below-mentioned endless belt 530 are attached to and removed from the traveling test apparatus 1 from a side at which the first and second driven pulleys 213 and 215 are not provided without removing driven pulleys.

A below-mentioned rotary encoder 217 (not shown) is provided at the rotation shaft 211 of the driving roller 212. By this rotary encoder 217, the number of revolutions of the driving roller 212 can be measured, and from the measurement result, a speed of the endless belt 220, that is, a circumferential velocity of the tire Wf in contact with the endless belt 220 can be determined.

As shown in FIG. 3, a supporting belt mechanism 500 is provided as another endless belt mechanism inside the endless belt 220. The supporting belt mechanism 500 includes rollers 510 and 520 and an endless belt 530 mutually linking the rollers 510 and 520. The rollers 510 and 520 are aligned in the back-and-forth direction, and, along with the movement of the endless belt 530, the rollers 510 and 520 are rotated together. It is noted that diameters of the rollers 510 and 520 are approximately 200 [mm].

The front roller 510 is provided with a roller adjustment mechanism 513 for shifting the roller 510 in the back-and-forth direction. The roller adjustment mechanism 513 adjusts a tension of the endless belt 530 to be an appropriate value by shifting the roller 510 with a feed screw mechanism.

The rollers 510 and 520 of the supporting belt mechanism 500 are arranged such that heights of upper ends thereof are higher than upper ends of the roller pair 210 of the flat-belt mechanism 200 or 300. Therefore, an inner circumferential surface of the endless belt 220 contacts with an outer circumferential surface of the endless belt 530, and the endless belt 220 is sandwiched between the outer circumferential surface of the endless belt 530 and the tire Wf during the test. The endless belt 530 is a rubber V-belt of a thickness of approximately 1.0 [mm]. The endless belt 530 is revolved in accordance with the endless belt 220 by a frictional force generated between the endless belts 220 and 530.

Hence, according to the present invention, the tire Wf of the car C is supported by the two endless belts 220 and 530 each of which mutually links the corresponding roller pair. When the tire is supported only by one endless belt, it is required to enlarge thickness of the endless belt sufficiently so as to secure strength and stiffness of the endless belt. Since it is hard to reduce a curvature radius of an endless belt with a high stiffness, it is necessary to make diameters of a roller pair several times as large as a diameter of the tire. On the contrary, in the present embodiment, the tire is supported by the two endless belts, and thereby it is possible to configure the driving roller 212 and driven roller 214 to have diameters of approximately 260 [mm], which are smaller than the diameter of the tire (approximately 600 [mm]). Additionally, in the present embodiment, since the supporting belt mechanism 500 is placed inside the endless belt 220, the traveling test apparatus 1 can be configured to employ the two belt mechanisms each of which is configured with the endless belt and the roller pair without drastically enlarging dimensions of the entire traveling test apparatus 1.

The rollers 510 and 520 are rotatably supported by bearings 512 and 522, respectively. The bearings 512 and 522 are fixed onto the roller supporting plate 236 via a bearing supporting member 540. The bearing supporting member 540 is a rectangle U-shaped member configured with a bottom surface 542, which horizontally extends, and side surfaces 543 and 544, which extend upward in a vertical direction from both right and left ends of the bottom surface 542, being mutually linked. As shown in FIG. 3, with the bottom surface 542 of the bearing supporting member 540 being bolt-fixed to an upper surface of the roller supporting plate 236, the bearing supporting member 540 is integrated with the roller supporting plate 236.

Hereinafter, a supporting roller mechanism 600 for supporting an upper portion of the endless belt 530 of the supporting belt mechanism 500 will be described. The supporting roller mechanism 600 is, as shown in FIG. 3, aligned in the back-and-forth direction, and provided with seven rollers 611 to 617 each of which has a rotation shaft directed in the right-and-left direction and a pair of bearing members 622 and 624 that rotatably support the rollers 611 to 617 at both ends thereof. A plurality of slits extending in the up-and-down direction are formed at each of the bearing members 622 and 624, and by letting a bolt pass through each of the slits, the bearing members 622 and 624 are fixed onto the side surfaces 543 and 544 of the bearing supporting member 540, respectively.

In addition, there are provided under the bearing members 622 and 624, adjusters 630 and 640 that support the bearing members 622 and 624 and adjust positions of the bearing members 622 and 624 in the up-and-down direction, respectively. The adjusters 630 and 640 respectively include base portions 631 and 641 fixed to project outward from the side surfaces 543 and 544 in the right-and-left direction, respectively, and a plurality of setscrews 632 and 642 provided to penetrate the base portions 631 and 641 in the up-and-down direction, respectively. Nuts 633 and 643 corresponding to the setscrews 632 and 642 are fixed onto upper surfaces of the base portions 631 and 641, respectively. Upper ends of the setscrews 632 and 642 establish contact with bottom surfaces of the bearing members 622 and 624, respectively. Namely, in a state where the bearing members 622 and 624 are not fixed onto the side surfaces 543 and 544 of the bearing supporting member 540, heights of the bearing members 622 and 624 and/or tilts of the bearing members 622 and 624 in the back-and-forth direction can be adjusted by rotating the setscrews 632 and 642 to move leading edges thereof in the vertical direction. With the adjusters 630 and 640, the heights of the upper ends of the rollers 611 to 617 are generally adjusted to be equal to or higher than the heights of the upper ends of the rollers 510 and 520 of the supporting belt mechanism 500.

The rollers 611 to 617 are configured to establish close contact with an upper portion of the inner circumferential surface of the endless belt 530 of the supporting belt mechanism 500. Hence, in a state where the tire Wf is placed on the flat-belt mechanism 200, the tire Wf is supported by not only the endless belts 220 and 530 but the rollers 611 to 617. Thereby, an amount of deflection of the endless belt due to a load of the car can be reduced, and it is possible to make the contact surface flatter. Further, in the present embodiment, since the endless belt in contact with the rollers 611 to 617 is made of rubber, uneven forces received from the rollers 611 to 617 are once absorbed and applied to the upper endless belt 220 as an even force. Therefore, according to the present embodiment, an effective force equivalent to that on the actual road can be applied to the tire.

As shown in FIG. 3, the main supporting plate 238 is fixed onto the base plate 700 with a bolt 710. In addition, crystal piezoelectric 6 component force load sensors 721 to 724 are provided between the main supporting plate 700 and the base plate 700 (only the load sensors 721 and 722 are shown in FIG. 3). The load sensors 721 to 724 are placed at four corners of the main supporting plate 238, respectively. Each of the load sensors 721 to 724 is formed in a disc shape with a through hole, and a predetermined preload is applied to each of the load sensors 721 to 724 by letting the bolt 710 pass through the through hole, sandwiching the load sensors 721 to 724 between the roller supporting plate 236 and the base plate 700, and fastening the bolt 710.

Figure 5:
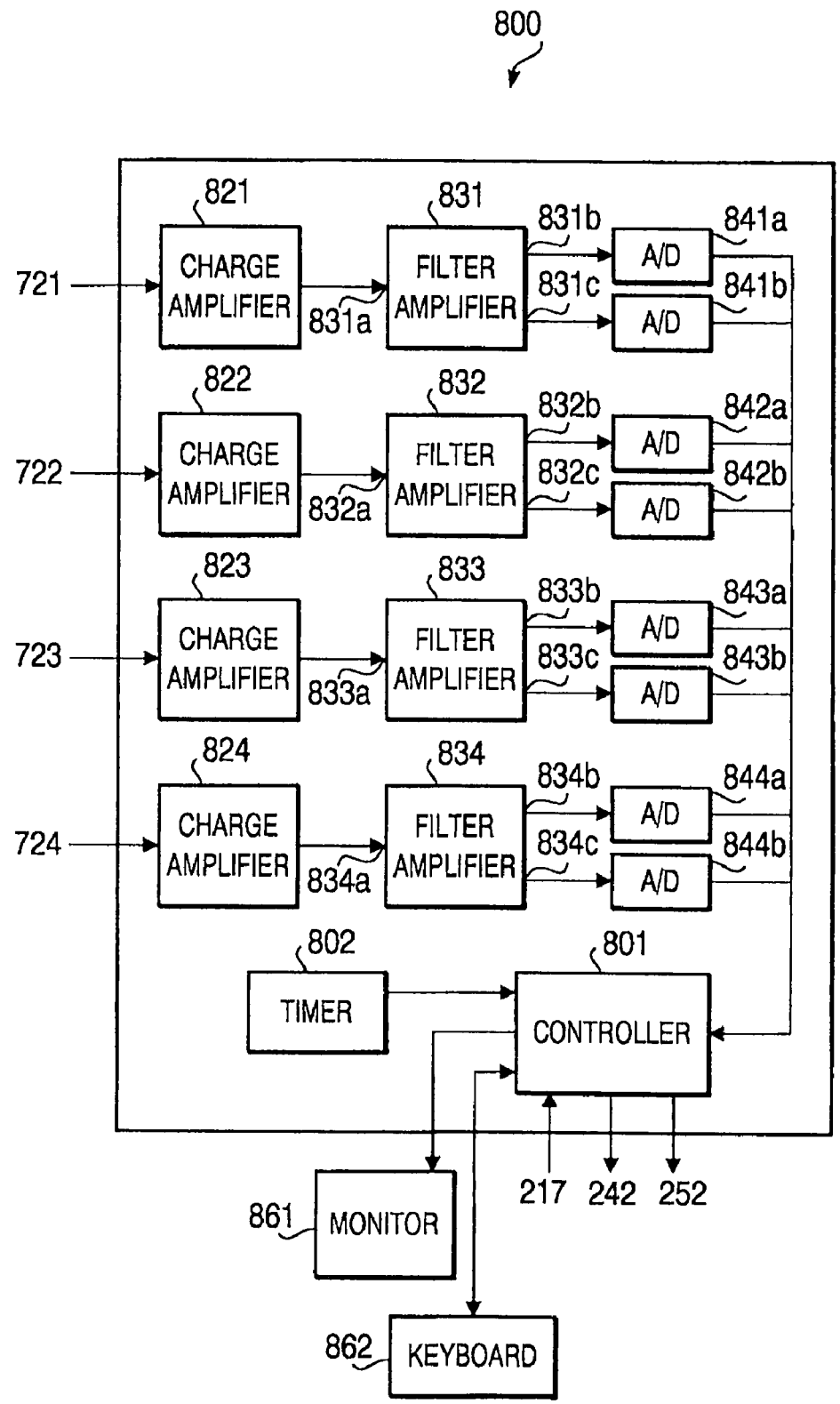
FIG. 5 is a block diagram of a control unit of the traveling test apparatus for the vehicle in the first embodiment according to the present invention.

Processing of output signals of the load sensors 721 to 724 and the rotary encoder 217, and control of the driving motors 242 and 252 (and processing of output signals of the load sensors and control of the driving motors of the flat-belt mechanism 300 corresponding to the above) are performed by a control unit 800. FIG. 5 is a block diagram of the control unit 800.

The load sensors 721 to 724 are respectively connected with charge amplifiers 821 to 824, by which respectively amplify outputs of the load sensors 721 to 724. Outputs of the charge amplifiers 821 to 824 are respectively inputted into signal input terminals 831a to 834a.

Filter amplifiers 831 to 834 respectively remove noises from the inputted signals, and concurrently amplify levels of the signals with predetermined gains. In addition, the filter amplifiers 831 to 834 respectively have control signal output terminals 831b to 834b and 831c to 834c, which are connected with a controller 801. The filter amplifiers 831 to 834 amplify the inputted signals with one of two kinds of predetermined gains A1 and A2. Signals amplified with the gain A1 are inputted to A/D converters 841a to 844a via the respective signal output terminals 831b to 834b of the amplifiers 831 to 834, and digitized by the A/D converters 841a to 844a. Further, signals amplified with the gain A2 are inputted to A/D converters 841b to 844b via the respective signal output terminals 831c to 834c of the amplifiers 831 to 834, and digitized by the A/D converters 841b to 844b. It is noted that the gain A2 is higher than the gain A1.

The digitized signals are inputted to the controller 801 and processed thereby. It is noted that, the present embodiment is, for the sake of simplicity, represented as a configuration to process the output from each of the load sensors 721 to 724 by a single signal processing system, yet each of the load sensors 721 to 724 is the 6 component force load sensor and therefore has 6 output terminals. Hence, the signal processing system of each of the load sensors 721 to 724 has 6 channel signal processing systems.

Furthermore, an output pulse of the rotary encoder 217 is inputted to the controller 801 as it is. The controller 801 is connected with a timer 802 to measure time. The controller 801 measures an interval of the pulse outputted by the rotary encoder 217 with reference to the timer 802. Thereby, the number of revolutions of the rotary encoder 217 (that is, of the driving roller 212) is measured.

In addition, the controller 801 is connected with the first and second driving motors 242 and 252, controlling operations of the driving motors 242 and 252.

The controller 801 is connected with a monitor 861 for displaying thereon indicators obtained by processing the outputs from each of the sensors and a keyboard 862 for inputting various data to the control unit 800 therethrough. An operator of the traveling test apparatus 1 can perform various controls of the traveling test apparatus 1 such as starting/stopping operations of the first and second driving motors 242 and 252 and recording of the measured results by inputting various data through the keyboard 862.

The above descriptions of the control unit 800 are explanations of relevance of the control unit 800 with the sensors and motors of the flat-belt mechanism 200, while the control unit 800, which is connected with the sensors and motors of the flat-belt mechanism 300 in the same manner, can process signals from the sensors and control the motors.

In the first embodiment according to the present invention described hereinabove, the endless belt 220 of the flat-belt mechanism 200 is supported from beneath by the endless belt 530 of the supporting belt mechanism 500 as the rubber V-belt. However, the present invention is not limited to the aforementioned configuration. A second embodiment described below shows a traveling test apparatus for a vehicle that employs a substitute supporting belt mechanism.

Figure 6:
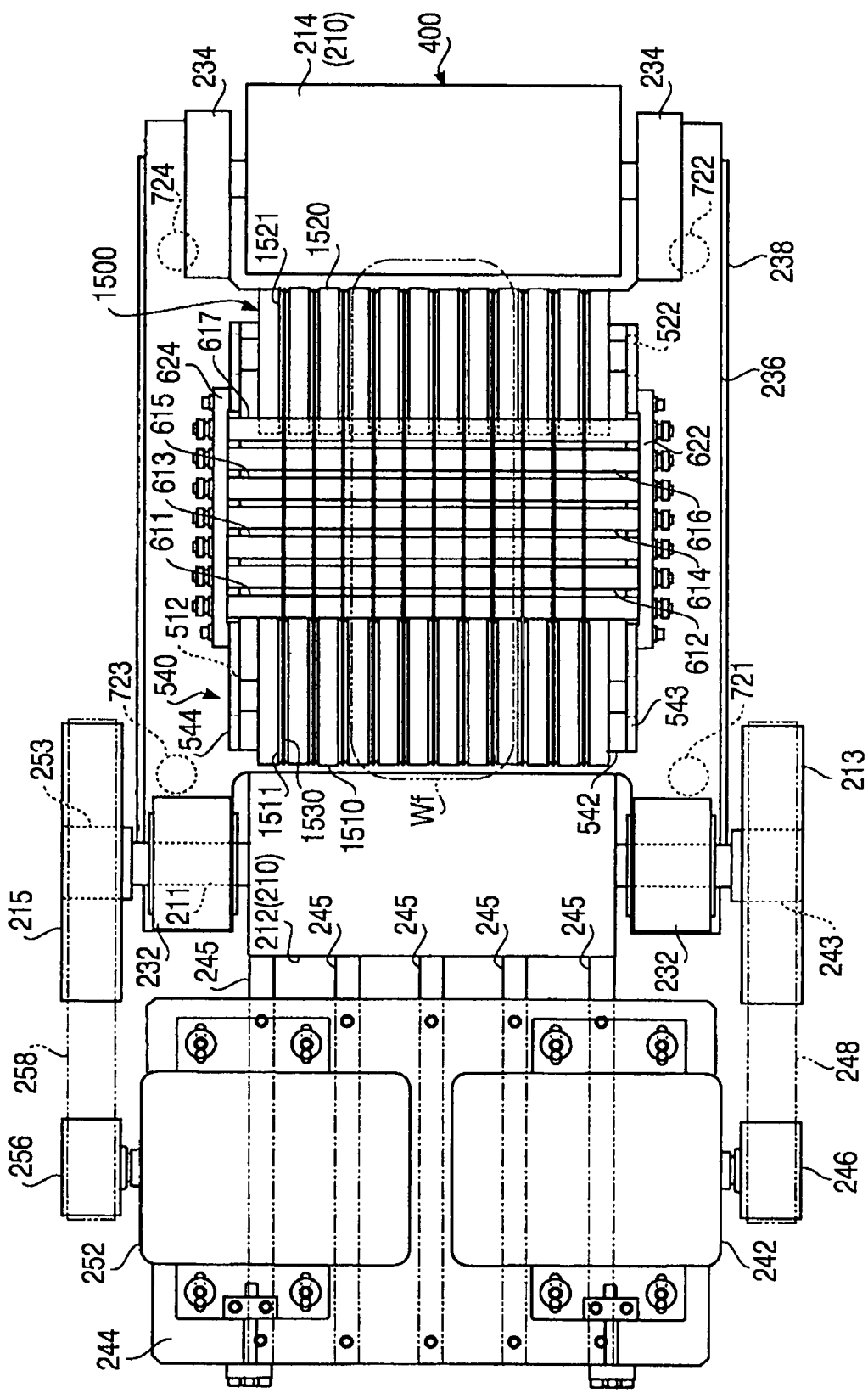
FIG. 6 is a top view of a steel belt mechanism of a traveling test apparatus for a vehicle in a second embodiment according to the present invention.

FIG. 6 is a top view of a steel belt mechanism 1500 of a traveling test apparatus 1 for a vehicle in a second embodiment according to the present invention. As shown in FIG. 6, differences of the second embodiment with the first embodiment are only portions regarding a supporting belt mechanism, and the other portions in the second embodiment are the same as the first embodiment. Therefore, explanations of portions other than the supporting belt mechanism will be omitted.

The supporting belt mechanism 1500 includes rollers 1510 and 1520. There are formed on respective circumferential surfaces of the rollers 1510 and 1520 a plurality of grooves 1511 and 1521 extending in a circumferential direction. One of the grooves 1511 on the roller 1510 and one of the grooves 1521 on the roller 1520 form a pair of grooves, which are formed substantially in the same plane. Grooves 1511 and 1521 of each pair are mutually linked by an endless wire 1530. Along with movement of the endless wire 1530, the rollers 1510 and 1520 are concurrently rotated. It is noted that diameters of the rollers 1510 and 1520 are approximately 200 [mm].

The rollers 1510 and 1520 of the supporting belt mechanism 1500 are arranged such that upper ends thereof are higher than those of the roller pairs of the flat-belt mechanisms 200 and 300. Each of the endless wires 1530 is a steel wire with a diameter of about 1.0 [mm], and further each of the grooves 1511 and 1521 has a depth of about 1.0 [mm]. By frictional forces generated between the endless belt 220 and the endless wires 1530, the endless wires 1530 are revolved in accordance with the endless belt 220.

Hence, according to the present embodiment, the tire Wf of the car C is supported by the endless belt 220 and endless wires 1530 that respectively link separate roller pairs. Accordingly, in the present embodiment as well, since the tire is supported by both the endless belt and the endless wires, it is possible to make the diameters of the driving roller 212 and driven roller 214 relatively small.

In the first and second embodiments described hereinabove, the traveling test apparatus 1 performs the measurements regarding the front tires Wf of the car C. However, it is possible as well to perform the tests regarding the rear tires Wb using a traveling test apparatus 1 with the rotational directions of the first and second driving motors 242 and 252 and the permitted rotational directions of the first and second one-way bearings 243 and 253 being reversed. Furthermore, in the present embodiment, although the tire Wf is rotated by driving the motors 242 and 252, the tire may be driven at the car C side when the tire Wf is a drive axle tire.

Further, the traveling test apparatuses in the embodiments are configured to include the three features of that the tire of the car is supported by the flat-belt mechanism, that the force applied to the road from the tire is measured by the crystal piezoelectric load sensor, and that the tire of the car is driven by one of the two kinds of power sources through the one-way bearing, yet the configuration of the present invention is not limited to those features. A configuration including any one or two of the above features is within a scope of the present invention as well. For example, a configuration using a rotating drum, instead of the flat-belt mechanism, of which an outer circumferential surface establishes contact with the tread surface of the tire or a configuration using a strain gauge load cell as substitute for the crystal piezoelectric load sensor is within the scope of the present invention as well.

With the traveling test apparatus 1 in the first or second embodiment according to the present invention described hereinabove, the test of the braking force of the front tire Wf of the car C and the test of the accuracy of the speedometer of the car C are implemented. Hereinafter, the procedures of the tests will be explained.

In a stage before the tests, the first and second driving motors 242 and 252 are not operated. In this state, the car C is driven, and as shown in FIG. 1, the front tires Wf of the car C are placed on the flat-belt mechanisms 200 and 300. Next, by operating the L-shaped guides 110 and tire holding means 120 and 130, the body Cb of the car C and the rear tires Wb are locked.

Initially, the braking force measurement of the front tires Wf is performed. First, by driving the first driving motor 242 of the flat-belt mechanism 200, one of the front tires Wf of the car is rotated. The controller 801 processes the output from the rotary encoder 217 and causes the monitor 861 to display thereon the speed of the above one of the front tires Wf of the car. After the speed of the one of the front tires Wf of the car has reached a circumferential velocity of 0.1 to 2.5 [km/h], the operator who is operating the control unit 800 informs a driver of the car C that the circumferential velocity of the front tire Wf of the car has been a predetermined value. In response to receiving the information, the driver of the car operates the foot brake of the car. At this time, based on the outputs of the 6 component force load sensors 721 to 724 provided at the flat-belt mechanism 200, the controller 801 calculates a component in a traveling direction of the braking force applied from the one of the front tires Wf of the car C to the flat-belt mechanism 200, and displays the calculated traveling-direction-component of the braking force on the monitor 861. The same applies to the other one of the front tires Wf of the car C. The operator confirms the calculated result displayed on the monitor 861 and judges whether the calculated result is within a predetermined criterion. The similar braking force measurement is implemented as well in a case of operating the side brake.

Subsequently, there is performed the force variation measurement for measuring the variations of the force applied from the tire to the road while the car C is traveling. For this measurement, the first driving motor 242 of the flat-belt mechanism 200 (and the corresponding motor of the flat-belt mechanism 300) is (are) driven such that the circumferential velocity of the front tires Wf becomes, for example, 6 [km/h]. At this time, the controller 801 processes the outputs from the 6 component force load sensors 721 to 724 of the flat belt mechanisms 200 and 300 and calculates and records the variations of the 6 component forces (the component forces in the traveling direction, width direction, and up-and-down direction, and torques with respect to the directions).

It is noted that, by carrying out the force variation measurement, which is performed as a test to be implemented for a finished car in the present embodiment, it is possible to measure uniformity of the tire.

Further, in the above-described braking force measurement, the load is required to be measured over a wide range of 0 to 1000 [kgf]. On the other hand, in the force variation measurement, a range necessary for measuring the force variations is over 0 to 100 [kgf]. In order to digitize the outputs from the sensors when measuring the force variations with high resolutions, the controller 801 measures the force variations using the outputs from the output terminals 831c to 834c with the gain A2. At this time, the outputs of the output terminals 831c to 834c have a sensitivity of 100 [kgf]/5 [V]. Meanwhile, in the braking force measurement, the controller 801 measures the braking forces using the outputs from the output terminals 831b to 834b with the gain A1. At this time, the outputs of the output terminals 831b to 834b have a sensitivity of 1000 [kgf]/5 [V]. A described before, since the crystal piezoelectric load sensor with a wide dynamic range is used in the present invention, even though the gain is set such that the output of the amplifier has the sensitivity of 100 [kgf]/5 [V], a high resolution can be secured.

Next, the accuracy of the speedometer of the car C is measured. The first driving motor 242 of the flat-belt mechanism 200 and the motor of the flat-belt mechanism 300 that corresponds to the first driving motor 242 are stopped, and instead the second driving motor 252 of the flat-belt mechanism 200 and the motor of the flat-belt mechanism 300 that corresponds to the second driving motor 252 are driven.

After the speed of the front tires Wf of the car has reached a predetermined circumferential velocity of 40 [km/h], the operator who is operating the control unit 800 informs the driver of the car C that the circumferential velocity of the front tires Wf of the car has been the predetermined value. In response to receiving the information, the driver of the car C records a value indicated by the speedometer of the car C at this time. By comparing the above predetermined circumferential velocity with the speed recorded by the driver of the car C, the operator judges whether the accuracy of the speedometer is within a predetermined criterion.

Hereinafter, there will be described a general overview of some aspects according to the present invention recited as the first and second embodiments. The aforementioned traveling test apparatus for a vehicle can be represented to have the following features.

According to an aspect of the present invention, a traveling test apparatus for a vehicle includes a flat-belt mechanism including a first pair of rollers, a first bearing portion having a pair of bearings which rotatably support the rollers of the first pair, respectively, and a first endless belt mutually linking the rollers of the first pair, wherein the flat-belt mechanism is configured such that at least one of tires provided to the vehicle establishes contact with the first endless belt, and that the first endless belt is revolved around the first pair of rollers by rotation of the at least one tire, a bearing supporting member to which a housing of the pair of bearings of the first bearing portion are fixed, a load sensor configured to measure a force transmitted from the tire of the vehicle to the flat-belt mechanism, and a base on which the bearing supporting member is placed, wherein the at least one tire and the first endless belt contact with each other substantially in a middle position between the rollers of the first pair.

According to the above configuration, various traveling tests are performed in a state where the tire is placed on the plane. Thereby, compared with such a conventional configuration that the tire establishes contact with a roller, testing conditions closer to actual road surface conditions can be attained.

In an aspect of the present invention, the load sensor may be arranged between the base and the bearing supporting member.

According to the above configuration, a force transmitted from the tire to the bearing via the first endless belt and the rollers can accurately be detected by the load sensor. In an aspect of the present invention, the first endless belt may be made of metal, particularly of a steel plate.

According to the above configuration, there can be attained a durability required for repeating a high speed test for a heavy vehicle.

In an aspect of the present invention, a slip-resistant material may be provided on an outer circumferential surface of the first endless belt.

According to the above configuration, it is possible to make the frictional coefficient on the first endless belt close to that on the actual road surface. Thereby, conditions close to an actual asphalt road surface can be reproduced, and the test conditions closer to an actual traveling test can be attained.

In an aspect of the present invention, the traveling test apparatus for the vehicle may further include a supporting belt mechanism that is provided with a second pair of rollers, a second bearing portion having a pair of bearings which rotatably support the rollers of the second pair, respectively, and a second endless belt mutually linking the rollers of the second pair, wherein an outer circumferential surface of the second endless belt may establish contact with an inner circumferential surface of the first endless belt, wherein the first endless belt may be sandwiched between the outer circumferential surface and the at least one tire, and wherein a housing of the pair of bearings of the second bearing portion may be fixed to the bearing supporting member.

According to the above configuration, the tire of the car is supported by two endless belts each of which mutually links a different pair of rollers. Therefore, a force applied to each of the endless belts is made smaller than a configuration including only one endless belt, and it is possible to reduce the thickness of each of the endless belts. Thus, it is possible to bend each of the endless belts with a small curvature radius and to use rollers with a small diameter. Consequently, a small-sized apparatus can be actualized.

In addition, since the second endless belt mechanism is placed inside the first endless belt mechanism, the two endless belt mechanisms can be included in the apparatus without drastically enlarging the dimensions of the entire traveling test apparatus.

In an aspect of the present invention, the second endless belt may be made of resin, particularly of rubber.

According to the above configuration, it is possible to bend the second endless belt with a small curvature radius and to actualize a small apparatus including two endless belt mechanisms. Further, the above configuration makes it possible to make a condition of the contact between the tire and the first endless belt flat and even since a strain and stress that are applied to the endless belt mechanisms are dispersed owing to the flexibility of the second endless belt.

Further, the usage of the resin belt contributes to weight saving and quietness of the apparatus and has an effect of protecting the apparatus from an impact during the test. In an aspect of the present invention, the second endless belt may be a V-belt.

According to the above configuration, a low-cost high-speed apparatus with a high power transmission performance can be attained.

In an aspect of the present invention, the second endless belt may be a plurality of metal endless wires mutually linking the rollers of the second pair.

According to the above configuration, the second endless belt can be bent with a further smaller curvature radius, and further smaller endless belt mechanisms with a high durability can be attained.

In an aspect of the present invention, a plurality of grooves may circumferentially be formed on a surface of each of the rollers of the second pair, and the plurality of metal endless wires may be hung around the second pair of rollers to be respectively fitted into the plurality of grooves.

According to the above configuration, since a friction between the endless wires and the grooves is strengthened and it is harder for the endless wires to drop off the rollers of the second pair, the engagement of the endless wires with the grooves can be ensured.

In an aspect of the present invention, the traveling test apparatus for the vehicle may further include a supporting roller mechanism provided with a plurality of supporting rollers, wherein the plurality of supporting rollers may establish contact with the second endless belt, and wherein the first and second endless belt may be sandwiched between at least one of the plurality of supporting rollers and the at least one tire.

According to the above configuration, since the tire is supported by the first and second endless belt mechanisms and supporting roller mechanism, it is possible to reduce deflection amounts of the endless belts, namely, a surface contacting with the tire becomes flatter. Consequently, test conditions closer to the actual road surface can be attained.

Furthermore, since the supporting roller mechanism is placed inside the first and second endless belt mechanisms, such a configuration that the tire is supported by the first and second endless belt mechanisms and supporting roller mechanism can be attained without drastically enlarging the dimensions of the entire traveling test apparatus.

In an aspect of the present invention, the supporting roller mechanism may include an adjuster configured to adjust a height and/or tilt of a plane defined by upper ends of the plurality of supporting rollers.

According to the above configuration, a condition of the contact between the tire and the first endless belt can appropriately be adjusted.

In an aspect of the present invention, the traveling test apparatus for the vehicle may further include a motor configured to rotate at least one of the rollers of the first pair.

According to the above configuration, rotational movements required for the tests can be applied to the tire of the vehicle by the traveling test apparatus for the vehicle, and various loads can be applied to the tire.

In an aspect of the present invention, the load sensor may be a six-component force sensor.

According to the above configuration, it is possible to measure 6 component forces including components of a force received from the tire parallel to axes along a back-and-forth direction, right-and-left direction, and up-and-down direction and moments of the force with respect to the axes and to acquire detailed data about movement conditions of a wheel.

In an aspect of the present invention, the traveling test apparatus for the vehicle may further include a rotary encoder provided at a rotation shaft of at least one of the rollers of the first pair.

According to the above configuration, the revolution number of a roller of the first pair can be measured by the rotary encoder, and from the measurement result, a speed of the first endless belt, that is, a circumferential velocity of the tire can be measured.

According to an aspect of the present invention, a traveling test apparatus for a vehicle includes a tire driving mechanism configured to establish contact with a tread surface of a tire provided to the vehicle and rotate the tire, a rotating member configured to drive the tire driving mechanism, a bearing provided to a rotation shaft of the rotating member, a base on which the bearing is placed, a first motor configured to rotate the rotating member, a first one-way bearing provided between a rotation shaft of the first motor and the rotation shaft of the rotating member, a second motor configured to rotate the rotating member, a second one-way bearing provided between a rotation shaft of the second motor and the rotation shaft of the rotating member, a rotary encoder configured to detect a revolution number of the rotating member, and a load sensor configured to measure a force transmitted from the tire of the vehicle to the tire driving mechanism.

According to the above configuration, the rotation member is driven and rotated in accordance with a motor rotating with a larger revolution number between the first and second motors. Therefore, even though only one of the first and second motors is driven, a non-driven motor does not provide a rotational resistance to the driven motor, and the rotation member can smoothly be rotated.

In an aspect of the present invention, the load sensor may be provided between the base and a housing of the bearing.

According to the above configuration, a force transmitted from the tire to the bearing can accurately be detected by the load sensor.

In an aspect of the present invention, the first motor may rotate the rotating member with a torque higher than that of the second motor, and the second motor may rotate the rotating member with a revolution number higher than that of the first motor.

According to the above configuration, it is possible to use a motor suitable for each test and to perform the speedometer test, force variation measurement, braking force measurement with the single apparatus without employing an expensive motor or transmission mechanism that enables high-torque rotation and high-speed rotation.

In an aspect of the present invention, the tire driving mechanism may be a rotating drum formed integrally with the rotating member.

According to the above configuration, there can be actualized a low-cost traveling test apparatus for a vehicle with a simpler configuration that can meet various tests.

According to an aspect of the present invention, a traveling test apparatus for a vehicle includes a tire driving mechanism configured to establish contact with a tread surface of a tire provided to the vehicle and rotate the tire, a rotating member configured to drive the tire driving mechanism, a bearing provided to a rotation shaft of the rotating member, the bearing rotatably supporting the rotation shaft, a base on which the bearing is placed, and a crystal piezoelectric load sensor configured to measure a force transmitted from the tire of the vehicle to the tire driving mechanism.

According to the above configuration, since a measurement error of the crystal piezoelectric load sensor is small, the braking force measurement with a wide load variation range and the force variation measurement with a narrow load variation range can be implemented with the same load sensor.

In an aspect of the present invention, the crystal piezoelectric load sensor may be provided between a housing of the bearing and the base.

According to the above configuration, a force transmitted from the tire to the bearing can accurately be detected by the load sensor.

In an aspect of the present invention, the traveling test apparatus for the vehicle may further include a first measuring means for measuring an output of the crystal piezoelectric load sensor with a first range, a second measuring means for measuring the output of the crystal piezoelectric load sensor with a second range wider than the first range, and a switching means for transmitting the output of the crystal piezoelectric load sensor selectively to one of the first measuring means and second measuring means.

According to the above configuration, a measurement can be carried out with the accuracy and/or dynamic range of a measurement being changed.

In an aspect of the present invention, the switching means may transmit the output of the crystal piezoelectric load sensor to the first measuring means when measuring a force variation generated while the vehicle is traveling, and the switching means may transmit the output of the crystal piezoelectric load sensor to the second measuring means when measuring a braking force generated while the vehicle is decelerated.

According to the above configuration, a measurement can be carried out with an accuracy and/or dynamic range suitable for each test.

It is noted that the above-described embodiments are illustrative, and the present invention is not limited to the description for the above embodiments. In particular, concrete numerical values and materials provided for the description of the above embodiments are just examples given for the sake of easy understanding of the present invention, but not given to limit a technical scope of the present invention. The technical scope of the present invention should be understood based on the description in "WHAT IS CLAIMED IS." In addition, various kinds of modifications, other than the above embodiments, may be possible within such a scope as not to extend beyond the inventive concept of the present invention.

What is claimed is:

1. A traveling test apparatus for a vehicle, comprising:
a flat-belt mechanism that includes:
a first pair of rollers; and
a first endless belt wound around the first pair of rollers,
the flat-belt mechanism being configured such that at least one tire of the vehicle can contact with the first endless belt, and that the first endless belt is revolved around the first pair of rollers by rotation of the at least one tire;
a supporting belt mechanism, arranged within a space surrounded by the first pair of rollers and the first endless belt, which includes:
a second pair of rollers; and
a second endless belt wound around the second pair of rollers,
the supporting belt mechanism being configured such that an upper outer circumferential surface of the second endless belt contacts with an upper inner circumferential surface of the first endless belt, and that the second endless belt is revolved around the second pair of rollers by the rotation of the at least one tire;
a supporting roller mechanism arranged within a space surrounded by the second pair of rollers and the second endless belt,
wherein the supporting roller mechanism includes a plurality of supporting rollers each of which is substantially as axially long as the second pair of rollers,
wherein the plurality of supporting rollers contact with an upper inner circumferential surface of the second endless belt, and
wherein the plurality of supporting rollers are rotated by the rotation of the at lease one tire.

2. The traveling test apparatus according to claim 1, wherein the supporting roller mechanism includes an adjuster configured to adjust a height and/or tilt of a plane defined by upper ends of the plurality of supporting rollers.

3. The traveling test apparatus according to claim 1, wherein the second endless belt comprises a plurality of metal endless wires wound around the second pair of rollers.

4. The traveling test apparatus according to claim 3, wherein each of the rollers of the second pair includes a plurality of grooves formed on an outer circumferential surface thereof in a circumferential direction thereof, and wherein the plurality of metal endless wires are hung on the rollers of the second pair to be respectively fitted in the plurality of grooves.

5. The traveling test apparatus according to claim 1, further comprising: a load sensor configured to measure a force transmitted from the at least one tire to the flat-belt mechanism; a first bearing portion having a pair of bearings that rotatably support the rollers of the first pair and a first housing in which the pair of bearings of the first bearing portion is housed; a second bearing portion having a pair of bearings that rotatably support the rollers of the second pair and a second housing in which the pair of bearings of the second bearing portion is housed; a bearing supporting member configured to support the first housing and the second housing; and a base on which the bearing supporting member is placed, wherein the load sensor is arranged between the base and the bearing supporting member.

6. The traveling test apparatus according to claim 5, wherein the load sensor comprises a six-component force sensor.

7. The traveling test apparatus according to claim 5, wherein the load sensor comprises a crystal piezoelectric load sensor.

8. The traveling test apparatus according to claim 7, further comprising: a first measuring unit configured to measure an output of the crystal piezoelectric load sensor with a first measuring range; a second measuring unit configured to measure the output of the crystal piezoelectric load sensor with a second measuring range wider than the first measuring range; and a switching unit configured to transmit the output of the crystal piezoelectric load sensor selectively to one of the first measuring unit and second measuring unit.

9. The traveling test apparatus according to claim 8, wherein the switching unit transmits the output of the crystal piezoelectric load sensor to the first measuring unit when measuring a force variation generated while the vehicle is traveling, and wherein the switching unit transmits the output of the crystal piezoelectric load sensor to the second measuring unit when measuring a braking force generated while the vehicle is decelerated.

10. A traveling test apparatus for a vehicle, comprising:
a flat-belt mechanism that includes:
a first pair of rollers;
a first endless belt wound around the first pair of rollers; and
a motor,
the flat-belt mechanism being configured such that at least one tire of the vehicle can contact with the first endless belt, and that the at least one tire is rotated by the first endless belt revolved around the first pair of rollers by rotation of the motor;
a supporting belt mechanism, arranged within a space surrounded by the first pair of rollers and the first endless belt, which includes:
a second pair of rollers; and
a second endless belt wound around the second pair of rollers,
the supporting belt mechanism being configured such that an upper outer circumferential surface of the second endless belt contacts with an upper inner circumferential surface of the first endless belt, and that the second endless belt is revolved around the second pair of rollers by the rotation of the motor;
a supporting roller mechanism arranged within a space surrounded by the second pair of rollers and the second endless belt,
wherein the supporting roller mechanism includes a plurality of supporting rollers each of which is substantially as axially long as the second pair of rollers,
wherein the plurality of supporting rollers contact with an upper inner circumferential surface of the second endless belt, and
wherein the plurality of supporting rollers are rotated by the rotation of the at lease one tire.

11. The traveling test apparatus according to claim 10, wherein the supporting roller mechanism includes an adjuster configured to adjust a height and/or tilt of a plane defined by upper ends of the plurality of supporting rollers.

12. The traveling test apparatus according to claim 10, wherein the second endless belt comprises a plurality of metal endless wires wound around the second pair of rollers.

13. The traveling test apparatus according to claim 12, wherein each of the rollers of the second pair includes a plurality of grooves formed on an outer circumferential surface thereof in a circumferential direction thereof, and wherein the plurality of metal endless wires are hung on the rollers of the second pair to be respectively fitted in the plurality of grooves.

14. The traveling test apparatus according to claim 10, wherein the motor comprises a first motor and a second motor that are configured to rotate at least one of the rollers of the first pair, and wherein the traveling test apparatus further comprises: a first one-way bearing provided between a rotation shaft of the first motor and a rotation shaft of the at least one of the rollers of the first pair; and a second one-way bearing provided between a rotation shaft of the second motor and a rotation shaft of the at least one of the rollers of the first pair.

15. The traveling test apparatus according to claim 14, wherein the first motor rotates the at least one of the rollers of the first pair with a torque higher than that of the second motor, and wherein the second motor rotates the at least one of the rollers of the first pair with a revolution number higher than that of the first motor.

16. The traveling test apparatus according to claim 10, further comprising: a load sensor configured to measure a force transmitted from the at least one tire to the flat-belt mechanism; a first bearing portion having a pair of bearings that rotatably support the rollers of the first pair and a first housing in which the pair of bearings of the first bearing portion is housed; a second bearing portion having a pair of bearings that rotatably support the rollers of the second pair and a second housing in which the pair of bearings of the second bearing portion is housed; a bearing supporting member configured to support the first housing and the second housing; and a base on which the bearing supporting member is placed, wherein the load sensor is arranged between the base and the bearing supporting member.

17. The traveling test apparatus according to claim 16, wherein the load sensor comprises a six-component force sensor.

18. The traveling test apparatus according to claim 16, wherein the load sensor comprises a crystal piezoelectric load sensor.

19. The traveling test apparatus according to claim 18, further comprising: a first measuring unit configured to measure an output of the crystal piezoelectric load sensor with a first measuring range; a second measuring unit configured to measure the output of the crystal piezoelectric load sensor with a second measuring range wider than the first measuring range; and a switching unit configured to transmit the output of the crystal piezoelectric load sensor selectively to one of the first measuring unit and second measuring unit.

20. The traveling test apparatus according to claim 19, wherein the switching unit transmits the output of the crystal piezoelectric load sensor to the first measuring unit when measuring a force variation generated while the vehicle is traveling, and wherein the switching unit transmits the output of the crystal piezoelectric load sensor to the second measuring unit when measuring a braking force generated while the vehicle is decelerated.

* * * * *